Figure 1:
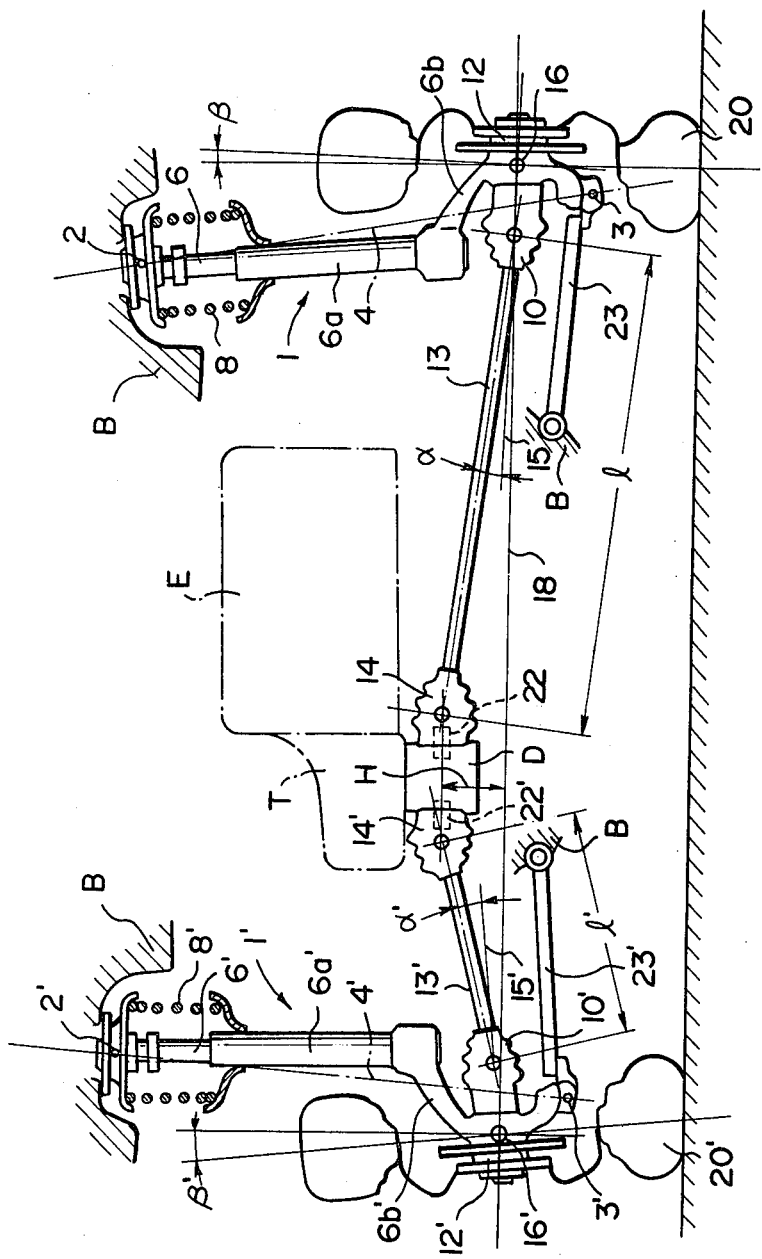

United States Patent [19]

Watanabe et al.

[11] 4,436,175

[45] Mar. 13, 1984

[54] FRONT WHEEL SUSPENSION FOR A FRONT ENGINE-FRONT WHEEL DRIVE AUTOMOBILE

[75] Inventors: Kenichi Watanabe; Takashi Sumimoto, both of Hiroshima, Japan

[73] Assignee: Toyo Kogyo Co., Ltd., Hiroshima, Japan

[21] Appl. No.: 407,173

[22] Filed: Aug. 11, 1982

[30] Foreign Application Priority Data

Aug. 12, 1981 [JP] Japan ................. 56-126400

[51] Int. Cl.³ .............. B62D 9/00; B60G 25/00
[52] U.S. Cl. .................... 180/254; 280/660; 280/688; 280/691
[58] Field of Search .......... 280/660, 661, 688, 690, 280/691; 180/253, 254, 256

[56] References Cited

U.S. PATENT DOCUMENTS 4,153,131  5/1979  Sakata et al. ................. 180/253

FOREIGN PATENT DOCUMENTS 49-20039   5/1974  Japan .
52-22225   2/1977  Japan .
54-138235  10/1979 Japan .

Primary Examiner—Joseph F. Peters, Jr.
Assistant Examiner—Kenneth R. Rice
Attorney, Agent, or Firm—Fleit, Jacobson, Cohn & Price

[57] ABSTRACT

A front engine - front wheel drive automobile having an engine located transversely of the automobile body and a differential gear unit which is sidewardly offset from the longitudinal center line of the automobile body. A left and right drive shafts extend from the differential gear unit to a left and right front wheels and have different lengths so that the drive shafts are inclined with respect to a horizontal plane by different angles. The wheel which is connected with the drive shaft with a larger inclination angle has a larger camber angle than the other wheel. The arrangement is effective to decrease the difference between turning moments about the left and right king pin axes due to the difference in inclination angles of the driving shafts.

5 Claims, 2 Drawing Figures

F I G. 2
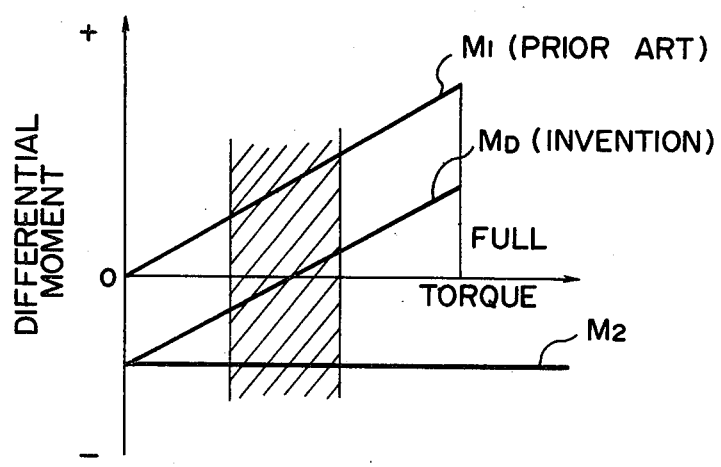

FRONT WHEEL SUSPENSION FOR A FRONT ENGINE-FRONT WHEEL DRIVE AUTOMOBILE

The present invention relates to front suspension means for front engine - front wheel drive vehicles. More particularly, the present invention pertains to front suspension means having left and right drive shafts of unequal lengths.

In a front engine - front wheel drive vehicle having an engine mounted transversely with respect to the longitudinal axis of the vehicle body, the transmission and the differential gear unit are sidewardly displaced with respect to the vehicle longitudinal axis so that the left and right drive shafts necessarily have different lengths. Such difference in the lengths of the drive shafts causes a difference in angles between the respective drive shafts and a horizontal plane and it has been recognized that the difference in such angles produces different amounts of moments about axes of king pins for steerably supporting the front wheels, when driving powers are being transmitted to the front wheels. Thus, the vehicle has a tendency of being naturally steered toward the side where the longer one of the drive shafts is located.

In order to eliminate the above problems, there has been proposed by Japanese Patent Application No. 50-97896 which has been filed on Aug. 12, 1975 and disclosed for public inspection on Feb. 19, 1977 under the disclosure No. 52-22225 to make the center offset of one wheel different from the other. In more detail, the center offset of the wheel at the side of the longer drive shaft is larger than that of the wheel at the other side so that the moments about the king pins be equalized. It should however be noted that the solution is not recommendable because such a difference between the center offsets in the wheels may produce further problems such as kick-back phenomenons in which shock loads are transmitted from the wheels to the steering mechanism. Further, it also becomes likely that the steering wheels will be forced undesirably to turn when the vehicle brake system is being operated.

In Japanese Patent Application No. 53-45869 filed on Apr. 20, 1978 and disclosed for public inspection on Oct. 26, 1979 under the disclosure No. 54-138235, there is proposed to mount the differential gear unit with its axes of output shafts inclined with respect to a horizontal plane so that the angle between the shorter drive shaft and a horizontal plane can be decreased to eliminate the above problems. The proposed arrangement may be effective to eliminate the aforementioned problems per se, however, further problems may arise from the structural viewpoints by mounting a differential gear unit per se or a power unit having such differential gear unit with an inclination.

It is therefore an object of the present invention to provide a front suspension mechanism for a front engine - front wheel drive type automobile wherein the adverse effects of the difference in the angles between a horizontal plane and the drive shafts can substantially be eliminated without producing further problems.

Another object of the present invention is to provide a front suspension mechanism for a front engine - front wheel drive type automobile which has means for balancing the difference in the moments about the king pins which have been caused by the difference in the angles between a horizontal plane and the drive shafts.

According to the present invention, there is provided a front engine - front wheel drive automobile comprising a power unit including differential gear means provided with a left and right output shafts, a left and right front wheels mounted for steering movements about a left and right king pin axes, respectively, a left and right drive shafts having one ends connected with said left and right output shafts of the differential gear means, respectively, and the other ends with said left and right wheels, respectively, to transmit driving torque to the wheels, said left and right drive shafts being inclined with respect to a horizontal plane by different angles so that a difference between turning moments about said left and right king pin axes is produced when the driving torque is being transmitted to the wheels, the wheel which is connected with the drive shaft with a larger inclination angle with respect to the horizontal plane having a larger camber angle than the other wheel to thereby produce a difference between turning moments about the left and right king pin axes which is in a direction opposite to the difference between turning moments caused by the different angles in inclination of the driving shafts.

According to one aspect of the present invention, the difference in the camber angle between the wheels can be provided by differentiating the inclination angles of the king pin axes. When the present invention is applied to an automobile having a strut type suspension mechanism wherein each wheel is supported by an oleo strut assembly and each king pin axis is defined by the point of pivotable connection between the upper end portion of the strut assembly and the automobile body and the point of pivotable support at the lower end portion of the strut assembly, the inclination angles of the king pin axes can be determined by the transverse positions of such points of pivotable connections. This arrangement is advantageous in that common parts can well be used in both left and right suspension mechanisms.

The above and other objects and features of the present invention will become apparent from the following descriptions of a preferred embodiment taking reference to the accompanying drawings, in which:

FIG. 1 is a fragmentary front view of an automobile having a front wheel suspension mechanism in accordance with one embodiment of the present invention; and FIG. 2 is a diagram showing a change in the moment about a king pin axis in response to a change in the wheel driving torque.

Referring now to the drawings, particularly to FIG. 1, there is shown an automobile having an engine E which is mounted transversely with respect to the longitudinal axis of the automobile body and has a power transmission T located at one end thereof. On the transmission T, there is mounted a differential gear unit D which has an input member (not shown) connected with an output member (not shown) of the transmission in a manner well known in the art. The differential gear unit D has a left and right output shafts 22 and 22' which are respectively connected through universal joints 14 and 14' with a left and right drive shafts 13 and 13'.

The suspension mechanism shown in FIG. 1 includes a left and right oleo strut assemblies 1 and 1' which have strut rods 6 and 6' slidably received by oleo cylinders 6a and 6a'. The rods 6 and 6' have upper ends connected with the automobile body B for swingable movement to a limited extent respectively about points 2 and 2'. The oleo strut assembly 1 and 1' are provided at the lower ends of the cylinders 6a and 6a' with brackets 6b and 6b' which are secured thereto. Between the cylinders 6a and 6a' and the upper ends of the strut rods 6 and 6', there are provided compression springs 8 and 8', respectively.

The brackets 6b and 6b' of the strut assemblies 1 and 1' support spindles 12 and 12' of a left and right front wheels 20 and 20', respectively, for rotation about axes of the wheels 20 and 20' through suitable bearings (not shown). Laterally extending swingable arms 23 and 23' are provided and have inner ends connected with the body B for vertical swingable movements. The outer ends of the swingable arms 23 and 23' support the lower ends of the brackets 6b and 6b' for pivotable movements about points 3 and 3' by means of ball joints (not shown). The left and right drive shafts 13 and 13' are extended obliquely downwardly from the universal joints 14 and 14' and connected at their outer ends through universal joint 10, 10' with the spindles 12 and 12' of the wheels 20 and 20', respectively. Thus, the wheels 20 and 20' are steerable about axes 4 and 4' passing through the points 2, 2' and 3, 3', respectively. Although not shown in FIG. 1, there is provided a steering mechanism for steering the wheels 20 and 20' in a conventional way.

As shown in FIG. 1, the left drive shaft 13 has a length l which is larger than the length l' of the right drive shaft 13' due to the fact that the differential gear unit D is offset toward the right from the transverse center of the body B. As the result, the angle $\alpha$ between the left drive shaft 13 and the axis 15 of the spindle 12 becomes smaller than the angle $\alpha'$ between the right drive shaft 13' and the axis 15' of the spindle 12'. The difference between the angles $\alpha$ and $\alpha'$ produces a difference between moments about the king pin axes 4 and 4' when driving torques are transmitted from the driving shaft 13 and 13' to the wheels 20 and 20' so that the wheels are unwillingly steered to one direction.

In FIG. 1, it will be noted that the wheels 20 and 20' are mounted with camber angles $\beta$ and $\beta'$, respectively. In the illustrated structure, the camber angles $\beta$ and $\beta'$ can be determined by the transverse positions of the points 2, 2' and 3, 3' which define the king pin axes 4 and 4'. In FIG. 1, the point 2 is laterally inwardly shifted than the point 2' so that the king pin axis 4 is more inclined inwardly than the king pin axis 4'. Thus, the camber angle $\beta$ for the left wheel 20 is smaller than the camber angle $\beta'$. The difference between the camber angles $\beta$ and $\beta'$ is effective to cancel or decrease the difference between the moments about the king pin axes 4 and 4'.

Speaking in more detail, the difference between the moments about the king pin axes 4 and 4' can be represented by the following formula:

$$M_1 = T \cdot \tan\left(\frac{\alpha' - \alpha}{2}\right) \tag{1}$$

where:
$M_1$ is the difference between the moments; and
T is the torque transmitted through the drive shafts 13 and 13'.

The difference in the camber angles $\beta$ and $\beta'$ produces a difference in the moments about the king pin axes 4 and 4' as follows:

$$M_2 = -K_M(\beta' - \beta) \tag{2}$$

where:
$M_2$ is the difference between the moments; and
$K_M$ is the camber torque coefficient.

Thus, the resultant differential moment $M_D$ can be represented by the following formula:

$$M_D = T \cdot \tan\left(\frac{\alpha' - \alpha}{2}\right) - K_M(\beta' - \beta) \tag{3}$$

Since the angles $\alpha$ and $\alpha'$ are small, the following approximation can be made.

$$\alpha = \arcsin\left(\frac{H}{l}\right) - \beta \approx \frac{H}{l} - \beta$$

$$\alpha' = \arcsin\left(\frac{H}{l'}\right) - \beta' \approx \frac{H}{l'} - \beta'$$

$$\tan\left(\frac{\alpha' - \alpha}{2}\right) \approx \frac{\alpha' - \alpha}{2}$$

where H is the vertical distance between a horizontal line 18 passing through the centers 16 and 16' of the wheels 20 and 20' and the centers of the universal joints 14 and 14'. Thus, the formula (3) can be rewritten as follows.

$$M_D \approx \tfrac{1}{2}\left\{ HT\left(\frac{1}{l'} - \frac{1}{l}\right) - (T + 2K_M)(\beta' - \beta) \right\} \tag{3'}$$

FIG. 2 shows the relationship among the differential moments $M_1$, $M_2$ and $M_D$. The differential moment $M_1$ which is caused by the difference in the angles $\alpha$ and $\alpha'$ increases in response to an increase in the torque T and always tends to steer the wheels toward the side where the longer drive shaft 13 is located. The differential moment $M_2$ which is produced by the difference in the camber angles $\beta$ and $\beta'$ remains substantially constant irrespective of any change in the torque T and tends to steer the wheels 20 and 20' in the opposite direction. Thus, the resultant differential moment $M_D$ changes from negative to positive as the driving torque T increases. It is preferable to determine the difference between the camber angles $\beta$ and $\beta'$ so that the absolute value of the resultant differential moment $M_D$ under the full load operation is equal to the absolute value under the no load operation. With this arrangement, it is possible to decrease the resultant differential moment $M_D$ significantly in a medium load range as shown by a shadowed area in FIG. 2. This condition can be established by the following equation.

$$M_D = -M_2 \tag{4}$$

Thus, from the equations (2), (3') and (4), the following relationship can be obtained.

$$\beta' - \beta = HT\left(\frac{1}{l'} - \frac{1}{l}\right) / (T + 4K_M) \tag{5}$$

It will therefore be understood that by making the camber angle of the wheel at the side where the longer drive shaft is located, smaller than that of the other wheel, it is possible to decrease the differential moment as a whole. Particularly, the differential moment can be decreased significantly under a medium load range.

The invention has thus been shown and described with reference to a specific embodiment, however, it should be noted that the invention is in no way limited to the details of the illustrated structures but changes and modifications may be made without departing from the scope of the appended claims.

We claim:

1. A front engine - front wheel drive automobile comprising a power unit including differential gear means provided with left and right output shafts, left and right front wheels mounted for steering movement about left and right king pin axes, respectively, left and right drive shafts having one end connected with said left and right output shafts of the differential gear means, respectively, and the other end with said left and right wheels, respectively, to transmit driving torque to the wheels, said left and right drive shafts being inclined with respect to a horizontal plane by different angles so that a difference between turning moments about said left and right king pin axes is produced when the driving torque is being transmitted to the wheels, the wheel which is connected with the drive shaft with a larger inclination angle with respect to the horizontal plane having a larger camber angle than the other wheel to thereby produce a difference between turning moments about the left and right king pin axes which is in a direction opposite to the difference between turning moments caused by the different angles in inclination of the driving shafts.

2. An automobile in accordance with claim 1 in which said left and right output shafts of the differential gear means are arranged horizontally, said differential gear means being sidewardly offset from a longitudinal center line of the automobile so that the left and right driving shafts have different lengths, said different angles in inclination of the driving shafts being caused by the different lengths of the driving shafts.

3. An automobile in accordance with claim 1 which includes left and right front wheel suspension means defining said left and right king pin axes, said suspension means being arranged so that the king pin axis for the wheel which is connected with the drive shaft with a larger inclination angle being inclined outwardly as compared with the other king pin axis whereby said wheel has a larger camber angle than the other wheel.

4. An automobile in accordance with claim 3 in which said left and right suspension means including a left and right oleo strut assemblies, respectively, each of said strut assemblies having an upper end connected with a body of the automobile for a pivotable movement about an upper pivot point and a lower end supporting one of said wheels, a swingable arm having one end vertically swingably connected with said body and the other end supporting the lower end of said strut assembly for a pivotable movement about a lower pivot point, said upper and lower pivot points defining one of said king pin axes.

5. An automobile in accordance with claim 1 in which said power unit includes an engine which is located transversely on the automobile.

* * * * *